W. F. HUTHER.

ROLLER BEARING.

APPLICATION FILED MAY 24, 1915.

1,180,586.

Patented Apr. 25, 1916.

2 SHEETS—SHEET 1.

Witness

[illegible]

Inventor

W. F. Huther

By A. B. Foster

Attorney

W. F. HUTHER.
ROLLER BEARING.
APPLICATION FILED MAY 24, 1915.

1,180,586.

Patented Apr. 25, 1916.
2 SHEETS—SHEET 2.

Witness
J. P. Appleman,

W. F. Huther Inventor

By A. B. Foster
Attorney

UNITED STATES PATENT OFFICE.

WILLIAM F. HUTHER, OF CANTON, OHIO.

ROLLER-BEARING.

1,180,586. Specification of Letters Patent. Patented Apr. 25, 1916.

Application filed May 24, 1915. Serial No. 30,086.

*To all whom it may concern:*

Be it known that I, William F. Huther, a citizen of the United States, residing at Canton, in the county of Stark and State of Ohio, have invented certain new and useful Improvements in Roller-Bearings, of which the following is a specification.

This invention relates to bearings of the type wherein accommodation is provided to reduce both the rotary frictions and the friction resultant from end thrust.

The principal object of the invention is to provide an improved form of anti-friction bearing so arranged that both rotary and thrust friction will be reduced.

A second object of the invention is to provide a cage for such bearings which will keep the various elements in proper correlated position.

A third object of the invention is to provide an improved combination of cone and ball bearings.

With the above and other objects in view, the invention consists in general of certain novel details of construction and combination of parts hereinafter fully described, illustrated in the accompanying drawings, and specifically claimed.

Figure 1:
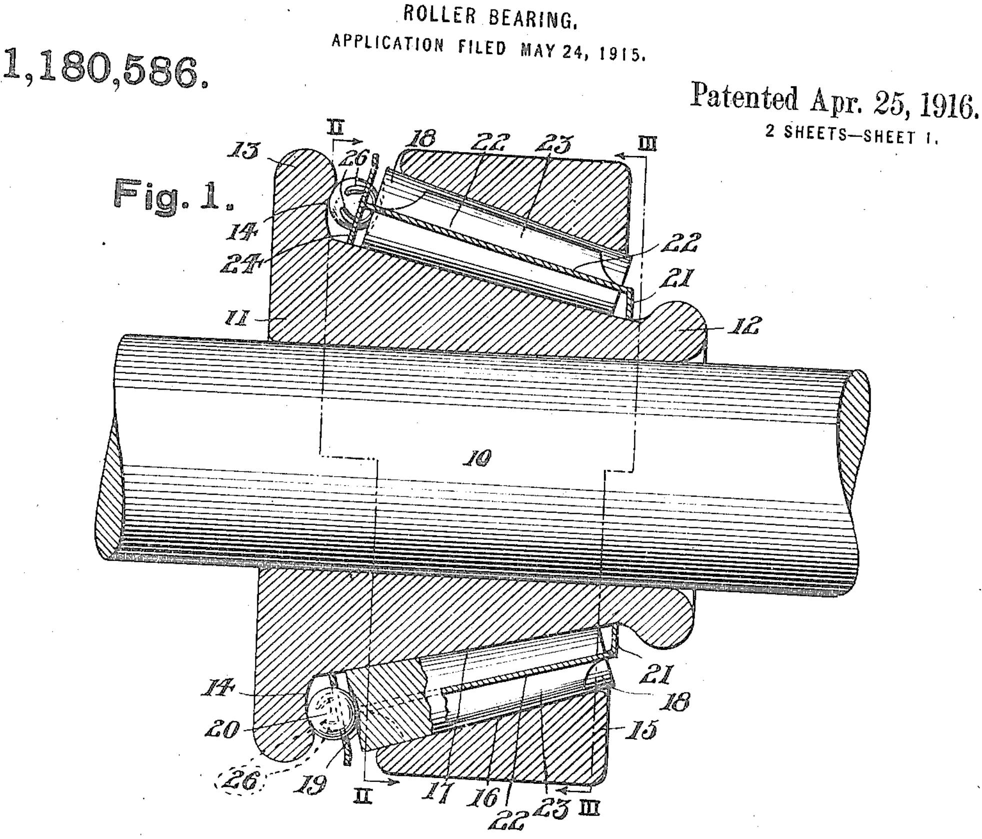
Figure 2:
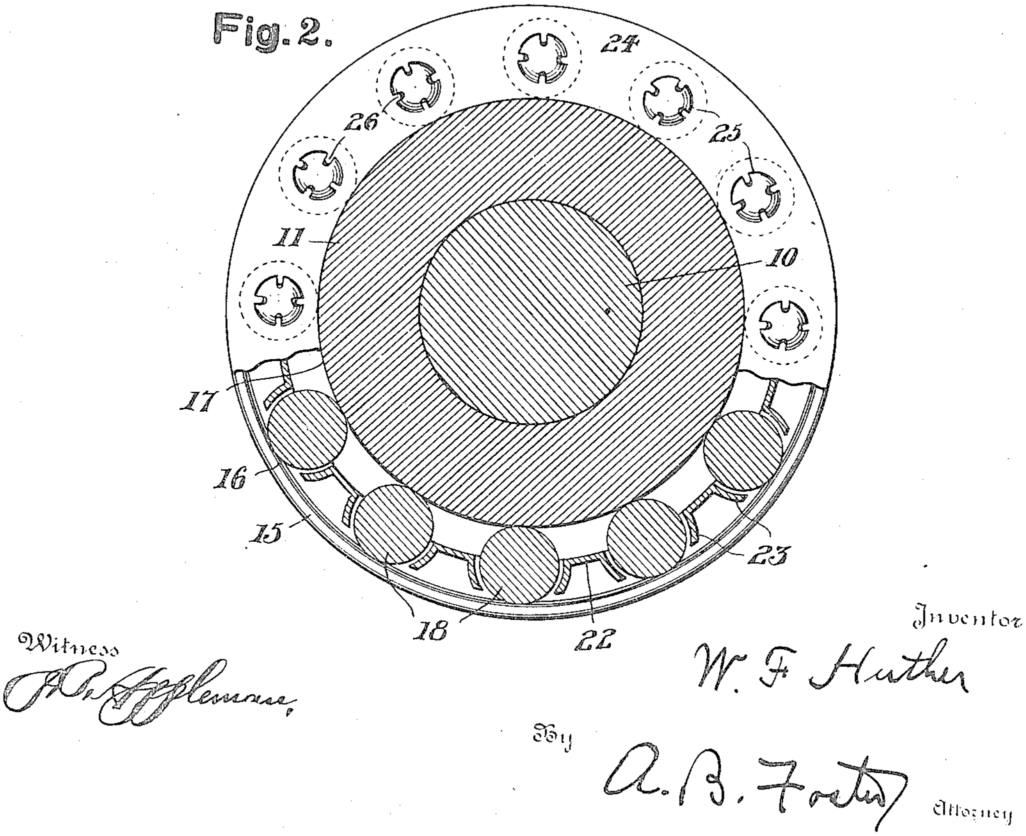
Figure 3:
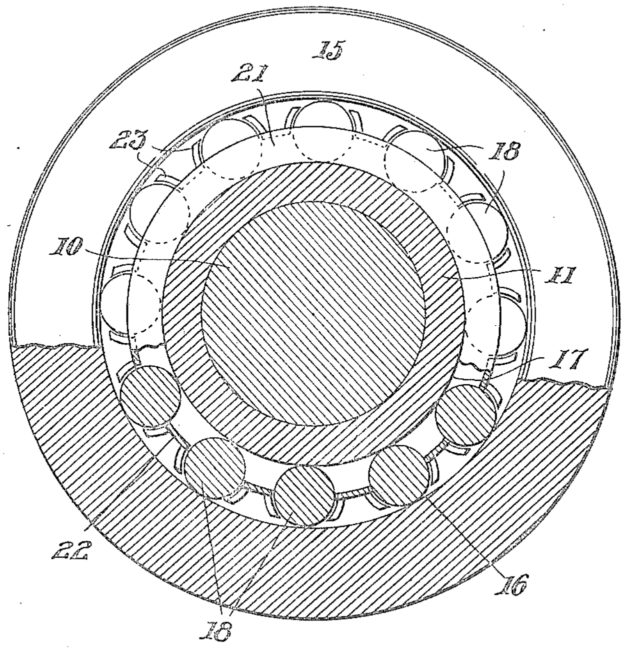
Figure 5:
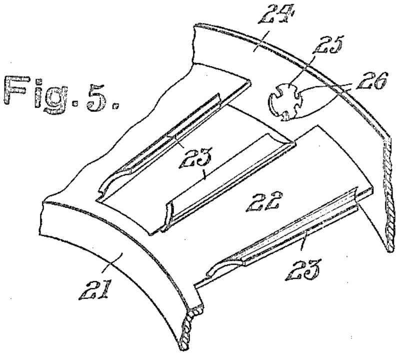
Figure 4:
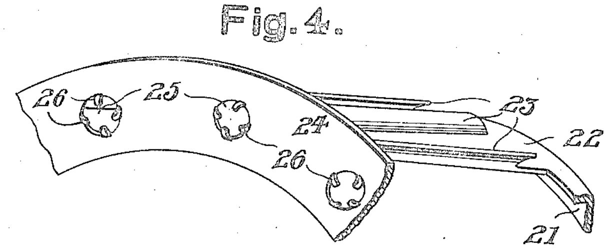

In the accompanying drawings, like characters of reference indicate like parts in the several views, and Fig. 1, is a sectional view taken through a bearing as applied to a shaft. Fig. 2, is a section on the line II—II of Fig. 1. Fig. 3, is a section on the line III—III of Fig. 1. Fig. 4, is a detail perspective view taken from that end of the cage which holds the balls of the bearing. Fig. 5, is a detail perspective view taken from the opposite end of such cage.

In the present embodiment of the invention, which is to be understood as merely one of those applications of the device which may be made and which may be varied according to the desired use without departing from its principles, there is disclosed a shaft 10 whereon is a cone 11 which has at its minor end an enlargement 12 and at its major end an enlargement constituting a flange 13, provided with a ball seat or race 14. This cone is normally intended to rotate with respect to a cup 15 which is provided on its inner surface with a frusto-conical face 16, a cone being provided on its outer surface with a frusto-conical face 17, the two faces having a common apex. Surrounding the cone is a series of rollers 18 which are of frusto-conical form, the apices of the rollers being coincident with the apices of the frusto-conical surfaces of the cone and cup, so that these rollers constantly contact with the cone and cup when in proper position. Each roller has at its major end a socket 19 which confronts the race 14 and in each of these sockets is fitted a ball 20.

In order to hold the rollers and balls in proper adjusted position there is provided a cage which consists of a minor or inner ring 21, preferably formed in a plane perpendicular to the axis of rotation of the cone and from which extends outwardly along the median plane of rotation of the rollers a series of ribs 22 having curved and diverging flange members 23 so arranged as to hold the cones in position. At the major end of the rollers this cage is provided with a ring 24 having spaced openings 25 therein which are axially alined with the rollers or bearings 18. Each of these openings 25 is formed by cutting out certain of the material of the ring 24 so as to leave a plurality of fingers 26 which are curved in such manner as to retain balls 20, between the sockets 24 and race 14, while at the same time, allowing these balls to freely rotate in such a position.

With the arrangement above described it will be seen that the cup 15, together with any parts which may be attached thereto and which are not deemed necessary here to be shown, will freely revolve with respect to the cone 11 on account of the interposition between the cup and cone of the bearings 18. At the same time any tendency of the cup 15 to cramp the bearings 18 between itself and the cone 11 will be counteracted by means of the balls 27 so that free rotation is obtained under all conditions.

It is obvious that the cup 15 may be contained in any desired rotative member such as a gear wheel, pulley, or other like device. There has thus been provided a simple and efficient device of the kind described and for the purpose specified.

It is obvious that many minor changes may be made in the form and construction of the device without departing from the material principles thereof. It is not therefore desired to confine the invention to the exact form herein shown and described, but it is wished to include all such as come within the scope claimed.

What I claim is:—

The combination with relatively rotatable members, antifriction rollers interposed between the said members and each having a ball-receiving socket in its end, a ball in each socket, one member being provided with a ball-race, a cage consisting of a roller-receiving member, formed of sheet metal and provided with spaced struck-up portions bent away to form roller-retaining means and having one end turned inward toward the inner of said members, said cage further being provided at its other end with a flange having spaced openings therein to receive the balls and being provided around the peripheries of said openings with fingers for holding the balls in position.

In testimony whereof I affix my signature in presence of two witnesses.

WILLIAM F. HUTHER.

Witnesses:
WILLIAM JACOB,
JOHN JACOB, Jr.

Copies of this patent may be obtained for five cents each, by addressing the "Commissioner of Patents, Washington, D. C."